US008630257B2

(12) United States Patent
Cha et al.

(10) Patent No.: US 8,630,257 B2
(45) Date of Patent: Jan. 14, 2014

(54) METHOD OF PERFORMING HANDOVER IN WIRELESS COMMUNICATION SYSTEM

(75) Inventors: Jae-Sun Cha, Daejeon (KR); Chul-Sik Yoon, Seoul (KR)

(73) Assignees: Samsung Electronics Co., Ltd., Suwon-si (KR); Electronics and Telecommunications Research Institute, Daejeon (KR)

(*) Notice: Subject to any disclaimer, the term of this patent is extended or adjusted under 35 U.S.C. 154(b) by 1169 days.

(21) Appl. No.: 12/304,733

(22) PCT Filed: Jun. 28, 2007

(86) PCT No.: PCT/KR2007/003157
§ 371 (c)(1),
(2), (4) Date: Dec. 12, 2008

(87) PCT Pub. No.: WO2008/002092
PCT Pub. Date: Jan. 3, 2008

(65) Prior Publication Data
US 2009/0196254 A1 Aug. 6, 2009

(30) Foreign Application Priority Data

Jun. 29, 2006 (KR) .................. 10-2006-0059072
Sep. 20, 2006 (KR) .................. 10-2006-0091411

(51) Int. Cl.
*H04W 4/00* (2009.01)
(52) U.S. Cl.
USPC ............................. 370/331; 370/32; 370/332
(58) Field of Classification Search
USPC ....................................................... 370/331
See application file for complete search history.

(56) References Cited

U.S. PATENT DOCUMENTS

| 6,430,414 B1 | 8/2002 | Sorokine et al. |
| 2005/0049000 A1 | 3/2005 | Sheynman et al. |
| 2005/0250498 A1 | 11/2005 | Lim et al. |
| 2005/0272426 A1 | 12/2005 | Yang et al. |
| 2006/0079235 A1 | 4/2006 | Kim |

FOREIGN PATENT DOCUMENTS

| KR | 10-2002-0065627 A | 8/2002 |
| KR | 10-2005-0089692 A | 9/2005 |
| KR | 10-2006-0013058 A | 2/2006 |
| KR | 10-0571785 B1 | 4/2006 |
| KR | 10-2006-0047727 A | 5/2006 |
| WO | 2005/107379 A2 | 11/2005 |
| WO | 2006/123863 A2 | 11/2006 |
| WO | 2007/133034 A2 | 11/2007 |

*Primary Examiner* — Shirpal Khajuria
(74) *Attorney, Agent, or Firm* — Jefferson IP Law, LLP

(57) ABSTRACT

The present invention relates to a handover method of a mobile station in a wireless communication system, and a base station and a mobile station for the same. A list of neighboring base stations that can accept a handover of a mobile station is shared by the mobile station and a serving base station before the mobile station performs the handover so as to reduce handover delay time in a high speed environment through addition, the active base station set managed by the mobile station and the serving base station can be managed with consideration of radio signal quality and resource state of each of the neighboring base stations included in the active base station set, and thus when the mobile station attempts a network re-entry process to a target base station that is not ready for the handover of the mobile station due to a loss of a handover control message, a handover failure due to a lack of radio resources can be prevented, thereby increasing a handover success rate.

19 Claims, 5 Drawing Sheets

METHOD OF PERFORMING HANDOVER IN WIRELESS COMMUNICATION SYSTEM

TECHNICAL FIELD

The present invention relates to a handover method of a mobile station, and a base station and a mobile station for the same, and particularly, to a mobile station that performs a handover based on a base station that manages a handover of the mobile station in a wireless communication system, and a handover method using the same.

BACKGROUND ART

In general, a mobile station accesses a base station (hereinafter referred to as a "serving base station") and performs data communication with the serving base station, and when a receiving strength of a radio signal transmitted from the serving base station is insufficient, the mobile station performs a handover process. In this case, handover control signals such as a mobile station handover request (MSHO-REQ) message, a base station handover response (BSHO-RSP) message, and a handover indication (HO-IND) message need to be successfully exchanged between the serving base station and the mobile station in order for the mobile station to decide and perform the handover.

However, when the mobile station moves at a high speed, a handover process must be promptly performed. Transmission/receiving of the above-stated messages may include a handover delay time.

In addition, when the mobile station moves at a high speed, radio signal quality at a boundary area of a cell managed by the serving base station may be decreased, and the mobile station may move out the cell boundary area of the serving base station without successfully exchanging the handover control messages with the serving base station. In this case, the mobile station may select a random handover target base station (hereinafter referred to as a "target base station") and request a handover from the target base station. However, when using a currently used method, the mobile station selects the target base station based on only a radio signal strength that is measured by a simple method.

Therefore, the mobile station may select a neighboring base station of the serving base station that is transmitting a radio signal with good quality but does not having sufficient radio resources, as a target base station, and the selected neighboring base station may not be able to accept the handover of the mobile station. This causes the mobile station to request a handover from another target base station, and accordingly a handover delay time is increased so that satisfactory service quality cannot be provided to a user.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for performing a handover with consideration of radio signal quality of a neighboring base station, measured by a mobile station, and a resource state of the neighboring base station before the mobile station starts the handover.

In addition, the mobile station manages a list of neighboring base stations that can accept the handover of the mobile station so as to improve a success rate of a handover even though a handover notifying message is lost due to deterioration of radio signal quality at a cell boundary area.

Further, the present invention provides a mobile station that can manage a list of neighboring base stations and a base station that manages the mobile station.

Technical Solution

According to one exemplary embodiment of the present invention, a method of performing a handover of a mobile station to one of a plurality of neighboring base stations in a base station of a wireless communication system is provided. The method includes: receiving a scanning report message reporting an update of an active base station set from the mobile station, the active base station set being a set of information on a plurality of neighboring base stations to which the mobile station can perform a handover; transmitting an active base station set setting message to the plurality of neighboring base stations based on the scanning report message so as to inform of the update of the active base station set and request whether each of the neighboring base stations can accept the handover; receiving an active base station information message including a handover acceptance information informing of call admission information from at least one of the neighboring base stations; and transmitting an active base station set indication message representing the handover acceptance information on one of the neighboring base stations based on the active base station information message so as to perform the handover of the mobile station.

According to another exemplary embodiment of the present invention, a method of performing a handover to one of a plurality of neighboring base stations from a serving base station in a mobile station of a wireless communication system is provided. The method includes: measuring a strength of a signal received from each of the plurality of neighboring base stations; updating an active base station set that is a list of neighboring base stations that can accept a handover according to the measuring result; transmitting a scanning report message to the serving base station by including information on the active base station set updated by the mobile station in the scanning report message; receiving an active base station indication message including handover acceptance information from each of the neighboring base stations; reflecting the handover acceptance information to the active base station set; selecting a target base station based on the active base station set to which the handover acceptance information included in the active base station indication message is reflected; and performing a handover to the target base station.

According further another exemplary embodiment of the present invention, a method of performing a handover to one of a plurality of neighboring base stations from a serving base station in a mobile station of a wireless communication system is provided. The method includes: selecting one target base station from among a plurality of neighboring base stations included in an active base station set that is shared by the serving base station, the active base station set being a set of information on a plurality of neighboring base stations that can accept a handover of the mobile station; transmitting a handover indication message that includes an identifier of the target base station to the serving base station; and transmitting a ranging request message to the target base station to perform a network re-entry process.

According to yet another embodiment of the present invention, a mobile station for performing radio communication with at least one among a serving base station and a plurality of neighboring base stations in a wireless communication system is provides. The mobile station includes a signal detector, an active base station set storage unit, and an active base station state storage unit. The signal detector receives a plurality of signals from the plurality of neighboring base stations, measures strength of each of the received signals, and determines whether the measured strength is greater than a threshold. The active base station set storage unit stores information on a neighboring base station that has transmitted a signal with strength that is greater than the threshold. The active base station state storage unit stores information on resource states transmitted from the serving base station and the plurality of neighboring base stations.

According to yet another exemplary embodiment of the present invention, a base station for managing a handover of a mobile station based on a handover manager in a wireless communication system is provided. The base station includes an active base station set setting message generator and an active base station information message generator. The active base station set setting message generator generates an active base station set setting message that informs of a change in an active base station set to other base stations that are added to the handover manager or deleted from the handover manager, the active base station set being a set of information on a plurality of neighboring base stations to which the mobile station can perform a handover. The active base station information message generator generates an active base station information message including handover acceptance information that indicates whether the other base stations received the active base station set setting message can accept the handover of the mobile station.

MODE FOR THE INVENTION

Figure 1:
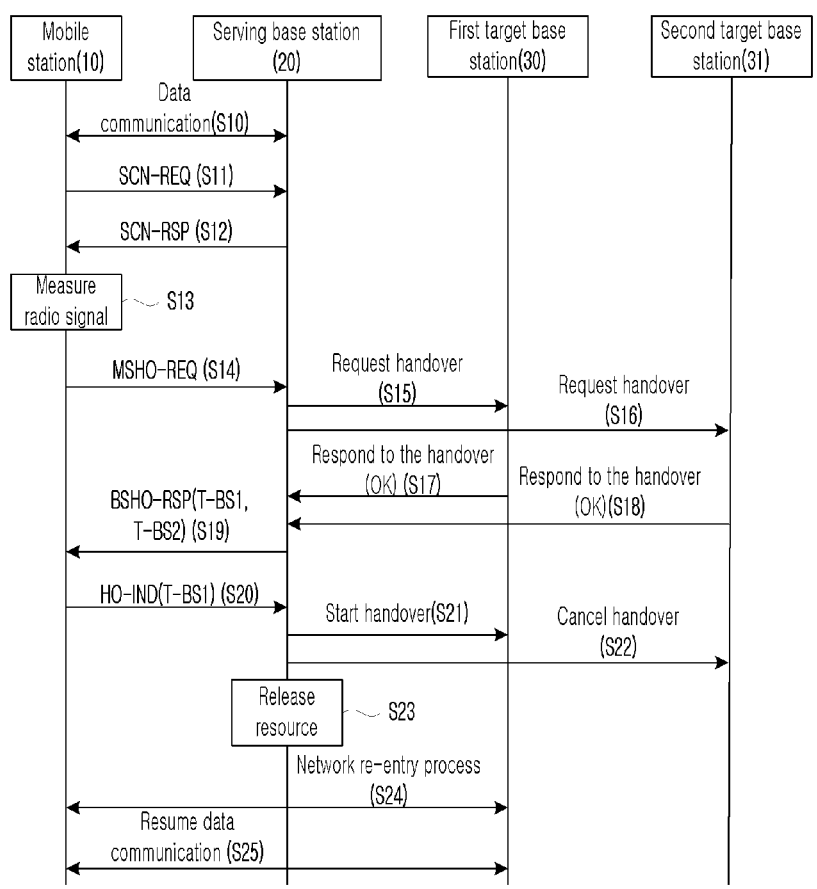
FIG. 1 is a flowchart of a typical handover process.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" and "comprising" will be understood to imply the inclusion of stated elements but not the exclusion of any other elements.

Before describing a handover method according to an exemplary embodiment of the present invention, a typical handover process will be described with reference to FIG. 1.

FIG. 1 is a flowchart of a typical handover process.

FIG. 1 shows flow of control messages between a mobile station (MS) 10 and base stations (BSs) 20, 30, and 31 when the MS 10 performs a handover according to the IEEE 802.16e standard. A base station to which the MS 10 is connected for data communication is a serving-base station (S-BS) 20 that allocates a radio resource for the MS 10 and manages radio resources.

In this case, the MS 10 continuously measures a radio signal strength received from the S-BS 20 even though the MS 10 is performing data communication with the S-BS 20. When the radio signal strength received from the S-BS 20 is less than a predetermined threshold level, the MS 10 needs to attempt a handover to neighboring BSs 30 and 31 of the S-BS 20.

In order to perform a successful handover, the MS 10 must select a neighboring BS (e.g., first target BS or second target BS) 30 or 31 that is transmitting a radio signal with good quality and attempt the handover. Therefore, the MS 10 measures a radio signal strength received from the S-BS 20 as well as radio signal strengths received from neighboring BSs during communication with the S-BS 20. In this case, since the communication between the MS and the S-BS 20 is disconnected while the MS 10 measures the radio signal strengths from the neighboring BSs, downlink data transmitted from the S-BS 20 to the MS 10 may be lost.

In order to prevent the data loss, the MS 10 transmits a scanning request (SCN-REQ) message to the S-BS 20 before measuring a radio signal of the neighboring BS 30 or 31 in step S11 so as to request time for measuring the radio signal received from the neighboring BS. When receiving the SCN-REQ message, the S-BS 20 transmits a scanning response (SCN-RSP) message to the MS 10 as a response, in step S12. Then, downlink data transmission between the MS 10 and the S-BS 20 is paused during a scanning time that has been mutually negotiated between the MS 10 and the S-BS 20 so that the MS 10 can measure the radio signal received from the neighboring BS without causing a data loss, in step S13.

When the radio signal strength received from the S-BS 20 is less then a predetermined level, the MS 10 transmits an MSHO-REQ message to the S-BS 20 in step S14 to notify handover intention to the S-BS 20. In this case, the MSHO-REQ message transmitted to the S-BS 20 includes information on radio signal strength (or quality) received from the neighboring BS, measured by the MS 10. When receiving the MSHO-REQ message, the S-BS 20 transmits the MSHO-REQ message including a quality of service (QoS) requested by the MS 10 to all neighboring BSs included in the MSHO-REQ message in order to determine whether they can accept the handover, in steps S15 and S16.

Among a plurality of the neighboring BSs that have received the MSHO-REQ message, a neighboring BS that can accept the handover of the MS 10 is set to be ready for the handover after allocating a radio resource by using information on the MS 10, included in the MSHO-REQ message. After that, the neighboring BS transmits a handover response message to the S-BS 20 as a response to the MSHO-REQ message so as to inform that the neighboring BS can accept the handover of the MS 10. When the neighboring BS cannot accept the handover of the MS 10, the neighboring BS informs that the neighboring station cannot accept the handover of the MS 10 to the S-BS 20 by transmitting a handover response message to the S-BS 20 without allocating a radio resource in steps S17 and S18.

When receiving handover response messages from all the neighboring BSs (or a first target BS and a second target BS) that have received the MSHO-REQ message, the S-BS 20 informs a list of neighboring BSs that can accept the handover of the MS 10 based on the received handover response messages. In this case, the list of the neighboring BSs is included in a BSHO-RSP message and transmitted to the MS 10, in step S19.

When receiving the BSHO-RSP message, the MS 10 transmits a HO-IND message specifying a target BS to which the MS 10 performs the handover to the S-BS 20 as final notification for the handover, in step S20. In this case, the target BS included in the HO-IND message is selected from the list of the BSs that can accept the handover, included in the BSHO-RSP message, and it is a recommendation rather than being mandatory.

After the MS 10 transmits the HO-IND message to the S-BS 20 in step S20, the MS 10 performs a network re-entry process with the target BS in step S24, and the MS 10 resumes data communication with the S-BS 20 from after the network re-entry process is successfully performed, in step S25. A control message initially transmitted during the network re-entry process is a ranging request (RNG-REQ) message. The MS 10 includes an identifier of a previously accessed S-BS 20 and the purpose of a ranging process in the RNG-REQ message so as to inform that the current ranging process is performed for the handover. This is because that when the MS 10 performs a handover not to the first target BS 30 included in the BSHO-RSP message but to another neighboring BS 31, the target BS request information on the MS 10 from the S-BS 20 for the handover of the MS 10 performs the handover, unlike a typical handover process.

When receiving the HO-IND message from the MS 10, the S-BS 20 releases the radio resource allocated to the MS 10 in step S23, and transmits a handover start message to the target BS included in the HO-IND message to inform of the start of the handover of the MS 10. Simultaneously, the S-BS 20 transmits a handover cancel message to a neighboring BS 31 that has not been selected as the target BS 30 by the MS 10 but is ready for the handover in order to command the neighboring BS 31 to cancel the preparation of the handover, in step S22.

When the handover is performed in such a typical manner, the above-stated messages need to be transmitted/received even though a prompt handover process is required for a fast moving MS 10, thereby increasing handover delay time. In addition, the MS 10 may move out of a cell boundary area of the S-BS 20 without successfully exchanging the control messages with the S-BS 20.

Therefore, two steps of a handover process are suggested according to the exemplary embodiment of the present invention. That is, managing an active BS set by using a handover manager and then performing a handover process based on the active BS set. Herein, the active BS set refers to a set of information on a plurality of neighboring BSs to which the MS 10 can perform a handover. The handover manager for managing the active BS set according to the exemplary embodiment of the present invention will be described in further detail with reference to FIG. 2.

Figure 2:
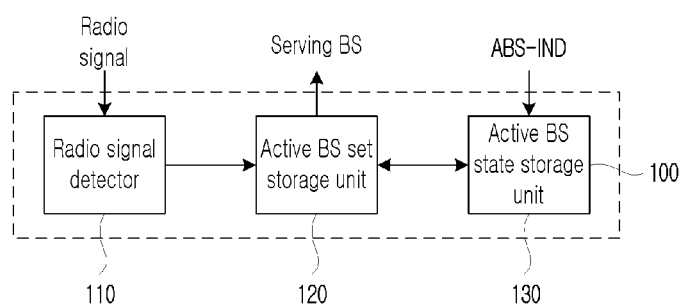
FIG. 2 is a configuration diagram of a handover manager according to an exemplary embodiment of the present invention.

FIG. 2 is a configuration diagram of the handover manager according to the exemplary embodiment of the present invention.

As shown in FIG. 2, the handover manager is included in an MS 100, and includes a radio signal detector 110, an active BS set storage unit 120, and an active BS state storage unit 130.

The radio signal detector 110 receives radio signals transmitted from a plurality of neighboring BSs during a predetermined time period that has been negotiated between the MS 100 and an S-BS (200 of FIG. 4) and measures strength of the received radio signals, that is, quality of the received radio signals. In this case, neighboring BSs that can accept a handover of the MS 100 among neighboring BSs that have transmitted radio signals with strength that is greater than a predetermined threshold level of the MS 100 become target BSs 300 and 310 to which the MS 100 will perform a handover. Information on the first target BS 300 and the second target BS 310 is transmitted to the active BS set storage unit 120 and stored therein.

The active BS set storage unit 120 stores the information on the BSs 300 and 310 that have been selected as target BSs by the radio signal detector 110. The information stored in the active BS set storage unit 120 includes identifiers of the first and second target BSs 300 and 310 and the radio signal quality of the respective target BSs 300 and 310, measured by the radio signal detector 110.

The active BS state storage unit 120 stores information on the resource state of neighboring BSs received from the S-BS 200. It can be determined whether a BS can accept the handover of the MS 100 based on the resource state of the BS, and the MS 100 may select a target BS based on the corresponding information.

In the case that the MS 100 having the handover manager of FIG. 2 performs a handover, constituent elements of BSs (including an S-BS and neighboring BSs) 300 and 310 connected with the MS 100 will be described with reference to FIG. 3.

Figure 3:
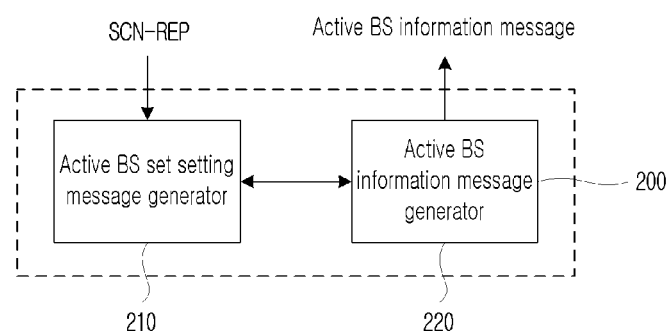
FIG. 3 is a configuration diagram of a base station according to the exemplary embodiment of the present invention.

FIG. 3 is a configuration diagram of a BS according to the exemplary embodiment of the present invention.

As shown in FIG. 3, the S-BS 200 that manages a handover of the MS 100 includes an active BS set setting message generator 210 and an active BS information message generator 220.

The active BS set setting message generator 210 generates a message to inform of any change in the active BS set to a new neighboring BS that is added to the active BS set storage unit 120 or a neighboring BS that is deleted from the active BS set storage unit 120. In this case, the active BS set setting message generator 210 does not transmit the message to neighboring BSs that are maintained in the same state without being added or deleted. The active BS set setting message includes an identifier of the MS 100 that has detected a radio signal, quality of service (QoS) information required by the MS 100, and a flag for indicating addition/deletion of a neighboring BS.

The active BS information message generator 220 generates an active BS information message including information on a state of radio resources that can be allocated by neighboring BSs 300 and 310 that can accept the handover of the MS 100. The active BS information messages are forwarded to the S-BS 200 from the neighboring BSs 300 and 310 to the S-BS 200. In this case, the active BS information message not only informs substantial radio resource allocation of the neighboring BSs 300 and 310 but also informs the S-BS 200 that the neighboring BSs 300 and 310 can accept the handover of the MS 100 when the MS 100 performs the handover thereto.

A handover method of an MS through the handover manager and the BS of FIG. 2 and FIG. 3 and a method for managing active BS set information required for the handover will be described in further detail. First, a method for managing an active BS set will be described in detail with reference to FIG. 4.

Figure 4:
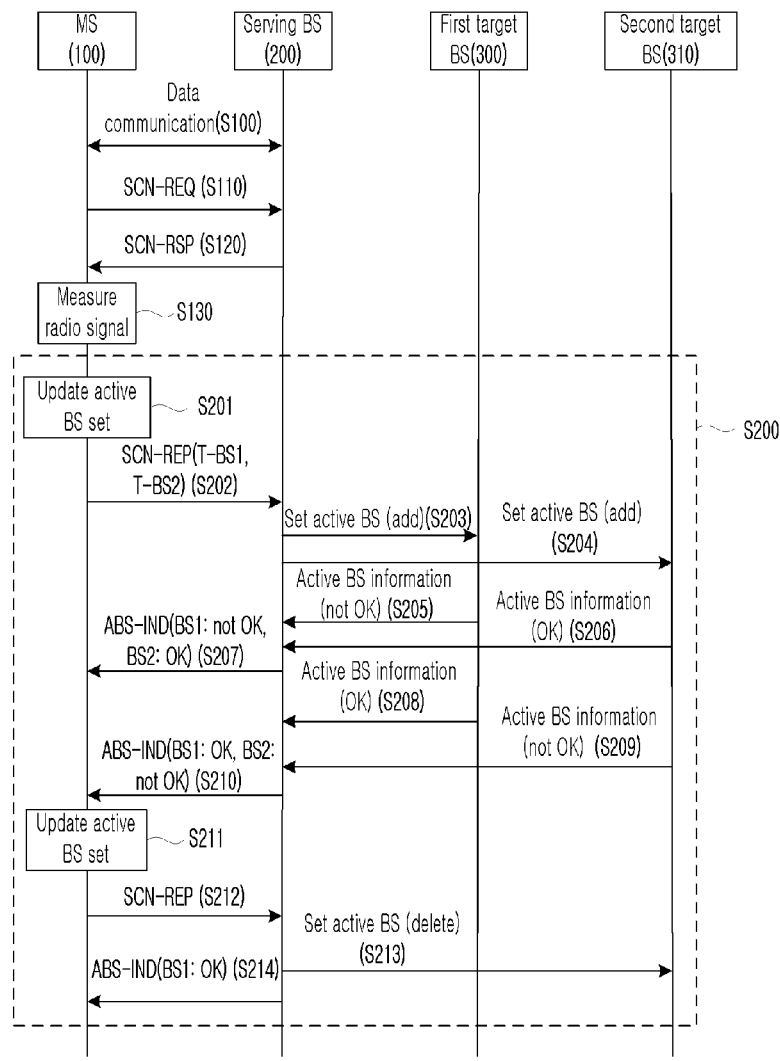
FIG. 4 is a flowchart of a method for managing an active base station set according to the exemplary embodiment of the present invention.

FIG. 4 is a flowchart of an active BS set management method according to the exemplary embodiment of the present invention.

As shown in FIG. 4, the MS 100 that performs data communication with the S-BS 200 in step S100 transmits an SCN-REQ message to the S-BS 200 so as to measure radio signal strengths received from a plurality of neighboring BSs in step S110. In this case, the SCN-REQ message includes radio signal measure time information that is required for measuring the radio signal strengths received from the neighboring BSs.

When the MS 100 periodically measures the radio signal strengths received from the neighboring BSs, the SCN-REQ message includes information on the corresponding measuring cycle, and as measuring of the strength of the radio signals are well known art a detailed description will be omitted.

When receiving the SCN-REQ message, the S-BS 200 transmits a SCN-RSP message to the MS 100 as a response, in step S120. During a time period negotiated between the MS 100 and the S-BS 200 through the SCN-RSP message, data communication between the MS 100 and the S-BS 200 is paused.

During the negotiated time period, the MS 100 measures the radio signal strengths received from the plurality of neighboring BSs, in step S130. When a radio signal strength that is greater than a predetermined threshold level among a plurality of the measured radio signal strengths exists, information on a neighboring BS that has transmitted the corresponding radio signal is added to a list (i.e., active BS set) of neighboring BSs that can accept a handover of the MS 100. Herein, the neighboring BS list includes an identifier of each of the neighboring BSs and radio signal strength of each of the neighboring BSs.

In this case, when a neighboring BS transmits a radio signal with strength that is lower than the predetermined threshold level, information on the corresponding neighboring BS is deleted from the active BS set even though the neighboring BS has already existed in the active BS set. While continuously measuring radio signal strengths, the MS 100 updates the active BS set when any change occurs in neighboring BSs included in the active BS set in step S201, and includes a list of the plurality of neighboring BSs that are currently included in the active BS set and a measuring result of a radio signal strength received from the corresponding BS in a scanning report (SCN-REP) message and transmits the SCN-REP message to the S-BS 200.

The SCN-REP message is generated only when the MS 100 measures the strength of a radio signal transmitted from each of the neighboring BSs and any change occurs in the measured information, and the generated SCN-REP message is transmitted to the S-BS 200, in step S202. In the present exemplary embodiment, assume that a first neighboring BS and a second neighboring BS are newly added to the active BS set.

When receiving the SCN-REP message, the S-BS 200 transmits the active BS set setting message to the first neighboring BS and the second neighboring BS that are included in the active BS set that is reported from the MS 100 in steps S203 and 204 so as to report changes in the active BS set managed by the MS 100. However, unlike a previous active BS set received from the MS 100, the active BS set setting message is transmitted to only neighboring BSs that are added to or deleted from the active BS set in order to inform of the changes, and neighboring BSs that are maintained in the same state do not receive the active BS setting message.

Herein, the active BS set setting message includes an identifier of the MS 100, information on QoS required by the MS 100, and an addition/deletion flag. The addition/deletion flag indicates whether a neighboring BS that has received the active BS set setting message is added to or deleted from the active BS set of the MS 100. In the present exemplary embodiment, the flag indicates that the first and second neighboring BSs are added to the active BS set.

When receiving the active BS set setting message, the first and second neighboring BSs 300 and 310 perform a call admission test so as to determine whether the QoS required by the MS 100 can be satisfied, and report the test result to the S-BS 20 through the active BS information message, in steps S205 and S206. When the call admission test is performed in a neighboring BS, a call admission test for another MS that has requested the call admission test for a handover in the same manner before the call admission test for the MS 100 is performed is not reflected, and the call admission test is performed by using QoS information of only an MS that is registered with a current neighboring BS and performs radio communication with the current neighboring BS. In the present exemplary embodiment of the present invention, the first neighboring BS 300 informs that the first neighboring BS 300 cannot accept a handover of the MS 100 in step S205, and the second neighboring BS 310 includes information that the second neighboring BS 310 can accept the handover of the MS 100 in the active BS information message and transmits the active BS information message to the S-BS 200, in step S206.

Herein, the second neighboring BS informs the S-BS 200 whether the second neighboring BS 310 can provide the QoS required by the MS 100 by using the active BS information message. Therefore, the reporting of the second neighboring BS 310 to the S-BS 200 that the second neighboring BS 310 can accept the handover does not imply that the second neighboring BS 310 has allocated a radio resource for the MS 100 but implies that the second neighboring BS 310 can accept the handover of the MS 100 when receiving a handover request from the MS 100.

In the case that a neighboring BS is initially added to the active BS set and thus exchanges an active BS set setting message and an active BS information message with the S-BS 200, the neighboring BS informs of a new radio resource state to the S-BS 200 through the active BS information message only when a current radio resource state is changed, unlike a previous transmission of the active BS information message. For example, assume that the first neighboring BS that could not accept the handover is changed to be able to accept the handover of the MS 100 and the second neighboring BS that could accept the handover is changed to not be able to accept the handover. Then, these changes are informed to the S-BS 200 by using the active BS information message, in steps S208 and S209.

The S-BS 200 informs the MS 100 whether the neighboring BSs included in the active BS set can accept the handover according to the active BS information messages received from the neighboring BSs. In this case, the S-BS 200 transmits an active BS set indication (ABS-IND) message in order to inform of the handover acceptance state of each of the neighboring BSs in step S210. The MS 100 stores information included in the ABS-IND message received from the S-BS 200 in the active BS state storage unit 220, and selects a target BS for a handover based on the information stored in the active BS state storage unit 220 in the case that a handover occurs.

When a predetermined radio signal strength measuring cycle or event is generated, the MS 100 measures radio signal strength of each of the neighboring BSs and changes the active BS set if any change occurs. For example, assume that the radio signal strength of only the first target BS 300 among the first and second target BSs 300 and 310 that have added to the active BS set through the steps S203 and S204 is greater than the threshold level according to a result of re-measuring of the radio signal strength. Then, the MS 100 informs that the radio signal strength of the first target BS 300 is greater than the threshold level to the S-BS 200 by using the SCN-REP message in step S212, and the S-BS 200 informs that the second target BS 310 is deleted from the active BS set since its state has been changed compared to the state in step S206, in step S213.

That is, when receiving the SCN-REP message from the MS 100, the S-BS 200 transmits the ABS-IND message to the MS 100 at the time that the S-BS 200 receives active BS information messages from all neighboring BSs that are newly added to the active BS set, in step S214. In addition, when the S-BS 200 receives the active BS information message from the neighboring BSs included in the active BS set according to a change in the radio resource state of each BS, the S-BS 200 transmits the ABS-IND message to the MS 100 when it receives the corresponding message.

A method for performing a handover based on the active BS set managing process of FIG. 4 will be described in further detail with reference to FIG. 5.

Figure 5:
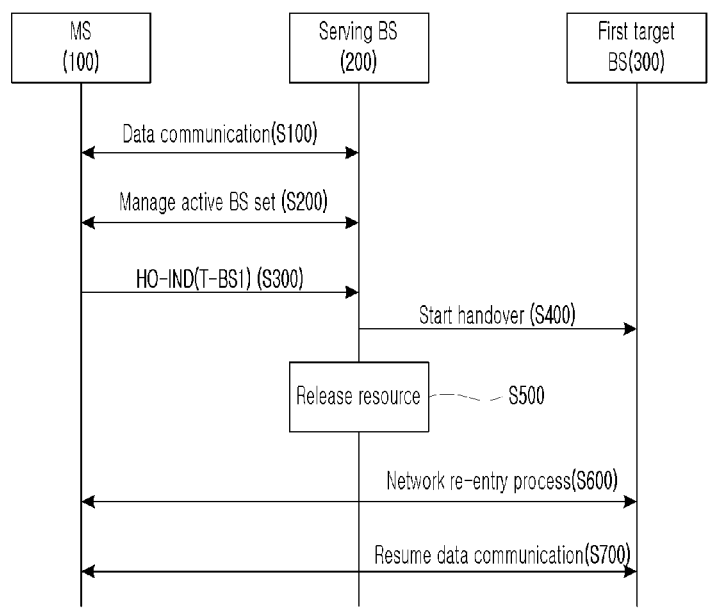
FIG. 5 is a flowchart of a handover process according to the exemplary embodiment of the present invention.

FIG. 5 is a flowchart of a handover process according to the exemplary embodiment of the present invention.

As shown in FIG. 5, when a handover is required from the MS 100 in data communication with the S-BS 200 in step S100, the MS 100 transmits a HO-IND message to the S-BS 200 so as to indicate handover intention to the S-BS 200, in step S300. Herein, the HO-IND message includes an identifier of a target BS 300 to which the MS 100 will perform a handover. Herein, the target BS 300 is a neighboring BS that is set to be able to accept the handover among the plurality of BSs included in the active BS set. The target BS can be selected through the management process (in step S200) of the active BS set and the selection of the target BS can be performed through the process of FIG. 3.

When receiving the HO-IND message from the MS 100 in step S300, the S-BS 200 transmits a handover start message to a target BS (e.g., the first target BS 300) specified in the HO-IND message to inform of the occurrence of the handover so that the target BS can accept the handover of the MS 100 to the target BS. After that, the S-BS 200 releases all radio resources allocated for data transmission to the MS 100, in step S500. In this case, the handover start message includes information on the MS 100 required for preparation of the handover, and the information includes, for example, an identifier of the MS 100, QoS required by the MS 100, and currently served services.

After transmitting the HO-IND message to the S-BS 200 in step S300, the MS 100 performs a network re-entry process with the first target BS 300 specified in the HO-IND message in step S600 and resumes data communication with the S-BS 200, in step S700. A message that is initially transmitted to the first target BS 300 for the network re-entry process is a RNG-REQ message. The RNG-REQ includes an identifier of a previous S-BS that has performed data communication with the MS 100, and specifies the purpose of a ranging process so as to inform that the MS 100 is currently performing the network re-entry process for the handover to the first target BS 300 that has received the RNG-REQ message.

In general, when an HO-IND message is lost in a cell boundary area due to a weak radio signal strength, the target BS cannot receive a handover start message from the serving BS and accordingly the target BS is not ready for a handover when the MS attempts a network re-entry process to the target base station, thereby causing the network re-entry process of the MS fail. However, when the MS 100 reports the handover to a serving base station specified in the RNG-REQ message as described above, the first target BS 300 requests information on the MS 100 from the serving base station 200 for achieving the handover of the MS 100.

That is, unlike a typical handover method, since a target base station is selected from base stations that are set to be able to accept a handover of a mobile station among a plurality of neighboring base stations included in an active base station set, a handover failure due to a radio resource state of the selected target base station does not occur. Therefore, the handover success rate can be enhanced.

The above-described methods and apparatuses are intended to be realized by a program for realizing functions corresponding to the environment establishment of the exemplary embodiment of the present invention or a recording medium for recording the program.

According to the above-described exemplary embodiment, a list of neighboring base stations that can accept a handover of a mobile station is shared by the mobile station and a serving base station so that a handover delay time can be reduced in a high speed environment by a simplified control message exchange process before the mobile station performs the handover.

In addition, the active base station set managed by the mobile station and the serving base station can be managed with consideration of radio signal quality and resource state of each of the neighboring base stations included in the active base station set, and thus when the mobile station attempts a network re-entry process to a target base station that is not ready for the handover of the mobile station due to a loss of a handover control message, a handover failure due to a lack of radio resources can be prevented, thereby increasing a handover success rate.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of performing a handover of a mobile station to one of a plurality of neighboring base stations in a base station of a wireless communication system, the method comprising:

receiving a scanning report message reporting an update of an active base station set from the mobile station, the active base station set being a set of information on a plurality of neighboring base stations to which the mobile station can perform a handover and being generated and managed by the mobile station, and the information on the plurality of neighboring base stations including identifiers of the plurality of neighboring base stations and radio signal qualities of the plurality of neighboring base stations;

transmitting an active base station set setting message to the plurality of neighboring base stations based on the scanning report message so as to inform of the update of the active base station set and request whether each of the neighboring base stations can accept the handover;

receiving an active base station information message including a handover acceptance information informing of call admission information from at least one of the neighboring base stations;

transmitting an active base station set indication message representing the handover acceptance information on one of the neighboring base stations based on the active base station information message so as to perform the handover of the mobile station.

2. The method of claim 1, wherein the mobile station updates information on the active base station set and transmits the scanning report message to the base station when at least one of strengths of radio signals transmitted from the plurality of neighboring base stations is greater or less than a threshold, wherein the scanning report message is generated when the information on the active base station set is changed.

3. The method of claim 2, wherein the scanning report message includes a list of a plurality of neighboring base stations included in the updated active base station set and information on the strengths of the radio signals transmitted from the neighboring base stations.

4. The method of claim 1, wherein the active base station set setting message includes an identifier of the mobile station, information on quality of service required by the mobile station, and a flag for indicating addition/deletion of a corresponding neighboring base station to/from the active base station set.

5. The method of claim 1, wherein a call admission test is performed by each neighboring base station to determine whether the respective neighboring base stations satisfy the quality of service required by the mobile station, and the handover acceptance information representing a result of the call admission test is included in the active base station set.

6. A method of performing a handover to one of a plurality of neighboring base stations from a serving base station in a mobile station of a wireless communication system, the method comprising:
measuring a strength of a signal received from each of the plurality of neighboring base stations;
updating an active base station set that is a list of neighboring base stations that can accept a handover according to the measuring result and is generated and managed by the mobile station, the list of the neighboring base stations including identifiers of the neighboring base stations and radio signal qualities of the neighboring base stations;
transmitting a scanning report message to the serving base station by including information on the active base station set updated by the mobile station in the scanning report message;
receiving an active base station indication message including handover acceptance information from each of the neighboring base stations;
reflecting the handover acceptance information to the active base station set;
selecting a target base station based on the active base station set to which the handover acceptance information included in the active base station indication message is reflected; and
performing a handover to the target base station.

7. The method of claim 6, wherein the updating comprises:
including a neighboring base stations whose signal strength is greater than a threshold in the active base station set; and
deleting a neighboring base station whose signal strength is less than the threshold from the active base station.

8. The method of claim 6, wherein the scanning report message includes an identifier of a neighboring base station that is newly added to the active base station set and information on a signal strength of the neighboring base station.

9. A method of performing a handover to one of a plurality of neighboring base stations from a serving base station in a mobile station of a wireless communication system, the method comprising:
storing, by the mobile station, information on resource states transmitted from the serving base station and a plurality of neighboring base stations;
selecting one target base station from among a plurality of neighboring base stations included in an active base station set that is shared by the serving base station, the active base station set being a set of information on a plurality of neighboring base stations that can accept a handover of the mobile station and being generated and managed by the mobile station, and the information on the plurality of neighboring base stations including identifiers of the plurality of neighboring base stations and radio signal qualities of the plurality of neighboring base stations;
transmitting a handover indication message that includes an identifier of the target base station to the serving base station; and
transmitting a ranging request message to the target base station to perform a network re-entry process,
wherein the ranging request message includes an identifier of the serving base station and information representing that the mobile station performs ranging for the purpose of the handover.

10. The method of claim 9, wherein the plurality of neighboring base stations included in the active base station set are neighboring base stations that have transmitted signals with strength that is greater than a threshold of the mobile station.

11. The method of claim 10, wherein the active base station is shared by the mobile station and the serving base station, and includes handover acceptance information on the plurality of neighboring base stations and information on signal strengths of the neighboring base stations.

12. The method of claim 9, wherein, when the handover indication message is lost, the method comprises:
detecting an identifier of the serving base station, included in the ranging request message, by the target base station;
requesting information on the mobile station to the serving base station based on the identifier of the serving base station, by the target base station; and
accepting a handover of the mobile station based on the information on the mobile station, by the target base station.

13. The method of claim 9, wherein the handover instructions message includes at least one of an identifier of the mobile station, a service flow of the mobile station, and authentication information.

14. A mobile station for performing radio communication with at least one among a serving base station and a plurality of neighboring base stations in a wireless communication system, the mobile station comprising:
a signal detector for receiving a plurality of signals from the plurality of neighboring base stations, measuring strength of each of the received signals, and determining whether the measured strength is greater than a threshold;
an active base station set storage unit for storing information on a neighboring base station that has transmitted a signal with strength that is greater than the threshold, and for generating and managing information on a plurality of neighboring base stations including identifiers of the plurality of neighboring base stations and radio signal qualities of the plurality of neighboring base stations; and an active base station state storage unit for storing information on resource states transmitted from the serving base station and the plurality of neighboring base stations.

15. The mobile station of claim 14, wherein the information on the neighboring base station includes an identifier of the neighboring base station stored in the active base station storage unit and information on the signal strength measured by the signal detector.

16. The mobile station of claim 14, wherein the mobile station selects a target base station to which the mobile station will perform a handover based on the information on the resource state stored in the active base station state storage unit.

17. The mobile station of claim 14, wherein the information on the resource states indicates whether the neighboring base station that has transmitted the signal with the strength that is greater than a threshold from the plurality neighboring base stations can accept a handover of the mobile station.

18. A base station for managing a handover of a mobile station based on a handover manager in a wireless communication system, the base station comprising:

an active base station set setting message generator for generating an active base station set setting message that informs of a change in an active base station set to other base stations that are added to the handover manager or deleted from the handover manager, based on a scanning report message received from the mobile station, the active base station set being a set of information on a plurality of neighboring base stations to which the mobile station can perform a handover and being generated and managed by the mobile station, and the information on the plurality of neighboring base stations including identifiers of the plurality of neighboring base stations and radio signal qualities of the plurality of neighboring base stations; and an active base station information message generator for generating an active base station information message including handover acceptance information that indicates whether the other base stations that received the active base station set setting message can accept the handover of the mobile station.

19. The base station of claim 18, wherein the active base station set setting message includes an identifier of a mobile station that has detected a signal transmitted from the base station, information on quality of service required by the mobile station, and a flag for indicating addition/deletion of the base station to/from the active base station.

* * * * *